(12) United States Patent
Spangler et al.

(10) Patent No.: US 10,301,964 B2
(45) Date of Patent: May 28, 2019

(54) BAFFLE WITH FLOW AUGMENTATION FEATURE

(71) Applicant: UNITED TECHNOLOGIES CORPORATION, Hartford, CT (US)

(72) Inventors: Brandon W. Spangler, Vernon, CT (US); Atul Kohli, Tolland, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 719 days.

(21) Appl. No.: 14/620,727

(22) Filed: Feb. 12, 2015

(65) Prior Publication Data

US 2015/0226085 A1 Aug. 13, 2015

Related U.S. Application Data

(60) Provisional application No. 61/938,867, filed on Feb. 12, 2014.

(51) Int. Cl.
| | |
|---|---|
| *F01D 5/18* | (2006.01) |
| *F01D 25/12* | (2006.01) |
| *F02C 7/12* | (2006.01) |
| *F01D 25/14* | (2006.01) |
| *F01D 9/06* | (2006.01) |
| *F23R 3/06* | (2006.01) |
| *F01D 9/02* | (2006.01) |

(52) U.S. Cl.
CPC .............. *F01D 25/12* (2013.01); *F01D 5/189* (2013.01); *F01D 9/065* (2013.01); *F01D 25/14* (2013.01); *F02C 7/12* (2013.01); *F23R 3/06* (2013.01); *F01D 5/186* (2013.01); *F01D 9/023* (2013.01); *F05D 2240/127* (2013.01); *F05D 2250/241* (2013.01); *F05D 2260/20* (2013.01); *F05D 2260/202* (2013.01); *F05D 2260/203* (2013.01); *F05D 2260/2212* (2013.01); *Y02T 50/672* (2013.01); *Y02T 50/676* (2013.01)

(58) Field of Classification Search
CPC ........... F05D 2260/20; F05D 2260/201; F05D 2260/202; F05D 2260/203; F05D 2260/2212; F01D 9/06
USPC ......................................................... 415/115
See application file for complete search history.

(56) References Cited

U.S. PATENT DOCUMENTS

| | | |
|---|---|---|
| 3,799,696 A | 3/1974 | Redman |
| 4,474,532 A | 10/1984 | Pazder |

(Continued)

FOREIGN PATENT DOCUMENTS

| | | |
|---|---|---|
| EP | 0568226 | 11/1993 |
| EP | 1284338 | 2/2003 |
| FR | 2920221 | 2/2009 |

OTHER PUBLICATIONS

European Search Report for European Application No. 15154731.2, dated Apr. 15, 2015.

*Primary Examiner* — Todd E Manahan
*Assistant Examiner* — Kyle Robert Thomas
(74) *Attorney, Agent, or Firm* — Carlson, Gaskey & Olds, P.C.

(57) ABSTRACT

One exemplary embodiment of this disclosure relates to a component for a gas turbine engine. The component includes a baffle provided in an internal cavity of the component. The baffle includes a wall having an orifice therethrough, and the baffle further includes a lobe extending from the wall and at least partially covering the orifice.

13 Claims, 7 Drawing Sheets

(56) References Cited

U.S. PATENT DOCUMENTS

| | | | |
|---|---|---|---|
| 4,753,575 A | | 6/1988 | Levengood et al. |
| 4,767,261 A | | 8/1988 | Godfrey et al. |
| 4,775,296 A | | 10/1988 | Schwarzmann et al. |
| 5,077,969 A | * | 1/1992 | Liang ............... F02K 1/822 |
| | | | 60/757 |
| 5,232,343 A | | 8/1993 | Butts |
| 5,403,159 A | | 4/1995 | Green et al. |
| 5,462,405 A | | 10/1995 | Hoff et al. |
| 5,695,320 A | | 12/1997 | Kercher |
| 5,695,321 A | | 12/1997 | Kercher |
| 5,695,322 A | | 12/1997 | Jacobson et al. |
| 5,752,801 A | | 5/1998 | Kennedy |
| 6,227,804 B1 | | 5/2001 | Koga et al. |
| 6,257,831 B1 | | 7/2001 | Papple et al. |
| 7,641,444 B1 | | 1/2010 | Liang |
| 7,955,053 B1 | | 6/2011 | Liang |
| 8,083,485 B2 | | 12/2011 | Chon et al. |
| 8,202,054 B2 | | 6/2012 | Liang |
| 8,348,613 B2 | | 1/2013 | Gregg et al. |
| 8,393,867 B2 | | 3/2013 | Chon et al. |
| 2003/0031555 A1 | * | 2/2003 | Noe ................ F01D 5/189 |
| | | | 415/115 |
| 2010/0247290 A1 | * | 9/2010 | Hada ............... F01D 5/189 |
| | | | 415/115 |
| 2012/0102910 A1 | | 5/2012 | Francisco et al. |

\* cited by examiner

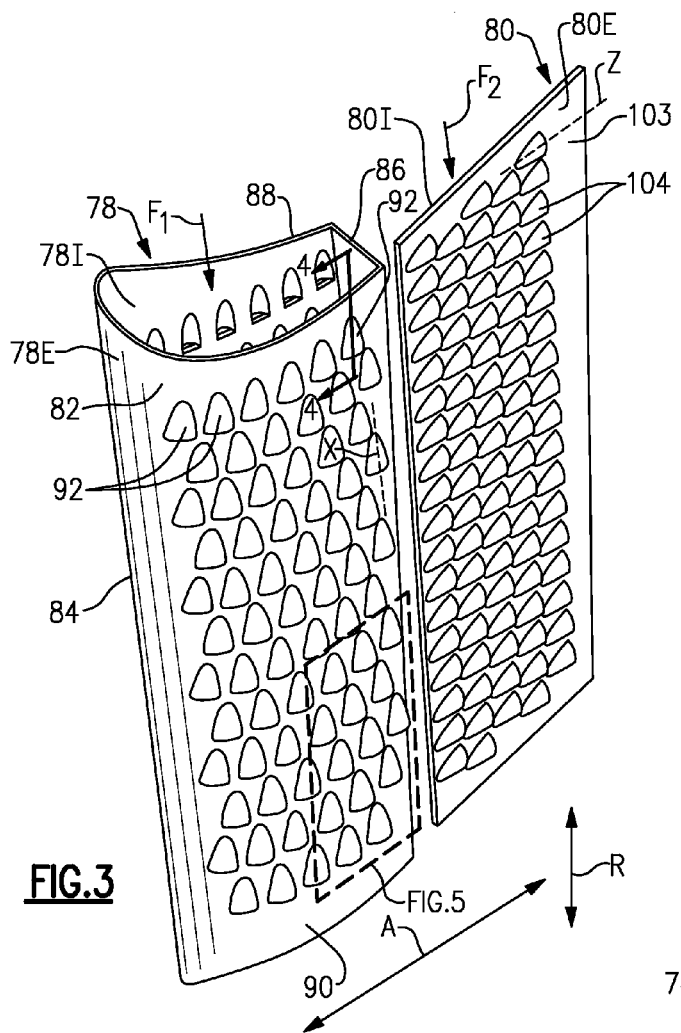
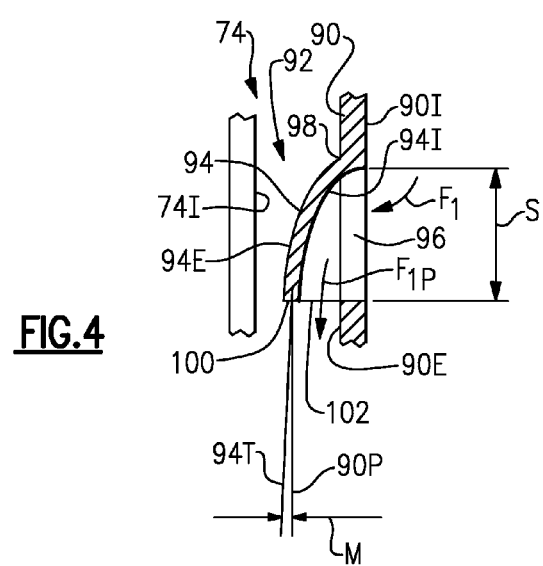
FIG.3
FIG.4

BAFFLE WITH FLOW AUGMENTATION FEATURE

BACKGROUND

Gas turbine engines typically include a compressor section, a combustor section and a turbine section. Both the compressor and turbine sections may include alternating series of rotor blades and stator vanes that extend into the core airflow path of the gas turbine engine. Stator vanes, and in particular those located in the turbine section, are cooled to increase performance and service life.

One known cooling technique includes providing turbulators (such as trip strips or pedestals) within an internal passageway of the vane. In another known technique, known as impingement cooling, a baffle is provided in an internal cavity of a vane. The baffle includes a plurality of orifices for directing a flow of cooling fluid within the interior of the vane in a desired manner.

SUMMARY

One exemplary embodiment of this disclosure relates to a component for a gas turbine engine. The component includes a baffle provided in an internal cavity of the component. The baffle includes a wall having an orifice therethrough, and the baffle further includes a lobe extending from the wall and at least partially covering the orifice.

In a further embodiment of any of the above, the lobe includes a projection, the projection connected to the wall at a first end and spaced-apart from the wall at a second end.

In a further embodiment of any of the above, the second end of the projection provides an injection orifice.

In a further embodiment of any of the above, the projection is inclined at an angle of less than or equal to 30°, relative to the wall, adjacent the injection orifice.

In a further embodiment of any of the above, a source of fluid is provided. The fluid is configured to flow adjacent the baffle, and a portion of the fluid flows through the orifice of the wall and is directed through the injection orifice by the projection.

In a further embodiment of any of the above, the engine component includes a first internal cavity and a second internal cavity, the first internal cavity provided adjacent a leading edge of the engine component, and the second internal cavity provided adjacent the trailing edge of the engine component.

In a further embodiment of any of the above, the first internal cavity includes a first baffle, and wherein the second internal cavity includes a second baffle.

In a further embodiment of any of the above, the first baffle has a perimeter, the first baffle including a leading edge, a trailing edge, a pressure side and a suction side, wherein the pressure side and the suction side each include a plurality of orifices and a plurality of lobes projecting therefrom to at least partially cover a corresponding one of the orifices.

In a further embodiment of any of the above, the plurality of lobes on the first baffle are provided about a central axis, the central axis being oriented in a radial direction.

In a further embodiment of any of the above, the second baffle includes a substantially planar wall, the wall including a plurality of orifices and a plurality of lobes projecting therefrom to at least partially cover a corresponding orifice.

In a further embodiment of any of the above, the plurality of lobes on the second baffle are provided about a central axis, the central axis being axially oriented.

In a further embodiment of any of the above, the component is a stator vane.

Another exemplary embodiment of this disclosure relates to a baffle for use with a gas turbine engine component. The baffle includes a wall, the wall having a geometry shaped to correspond to an internal cavity of the gas turbine engine component. The baffle further includes an orifice provided through the wall, and a lobe extending from the wall and at least partially covering the orifice.

In a further embodiment of any of the above, the lobe includes a projection connected to the wall at a first end and spaced-apart from the wall at a second end.

In a further embodiment of any of the above, the projection is inclined at an angle of less than or equal to 30°, relative to the wall, adjacent the second end.

In a further embodiment of any of the above, the wall includes a plurality of orifices, and a plurality of lobes extending from the wall to at least partially cover a respective one of the orifices.

In a further embodiment of any of the above, the lobes are arranged in rows, and wherein the lobes in adjacent rows are staggered relative to one another.

A further exemplary embodiment of this disclosure relates to a gas turbine engine. The engine includes a compressor section, a combustor section, and a turbine section. The engine further includes a component provided in one of the compressor section, combustor section, and the turbine section. The component has an internal cavity, and a baffle in the internal cavity. The baffle includes a wall and an orifice provided through the wall. The baffle further includes a lobe extending from the wall and at least partially covering the orifice.

In a further embodiment of any of the above, the lobe includes a projection, the projection connected to the wall at a first end and spaced-apart from the wall at a second end.

In a further embodiment of any of the above, the second end of the projection provides an injection orifice.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 3 is a perspective view of a first baffle and a second baffle.

FIG. 4 is a cross-sectional view taken along line 4-4 in FIG. 3.

DETAILED DESCRIPTION

Figure 1:
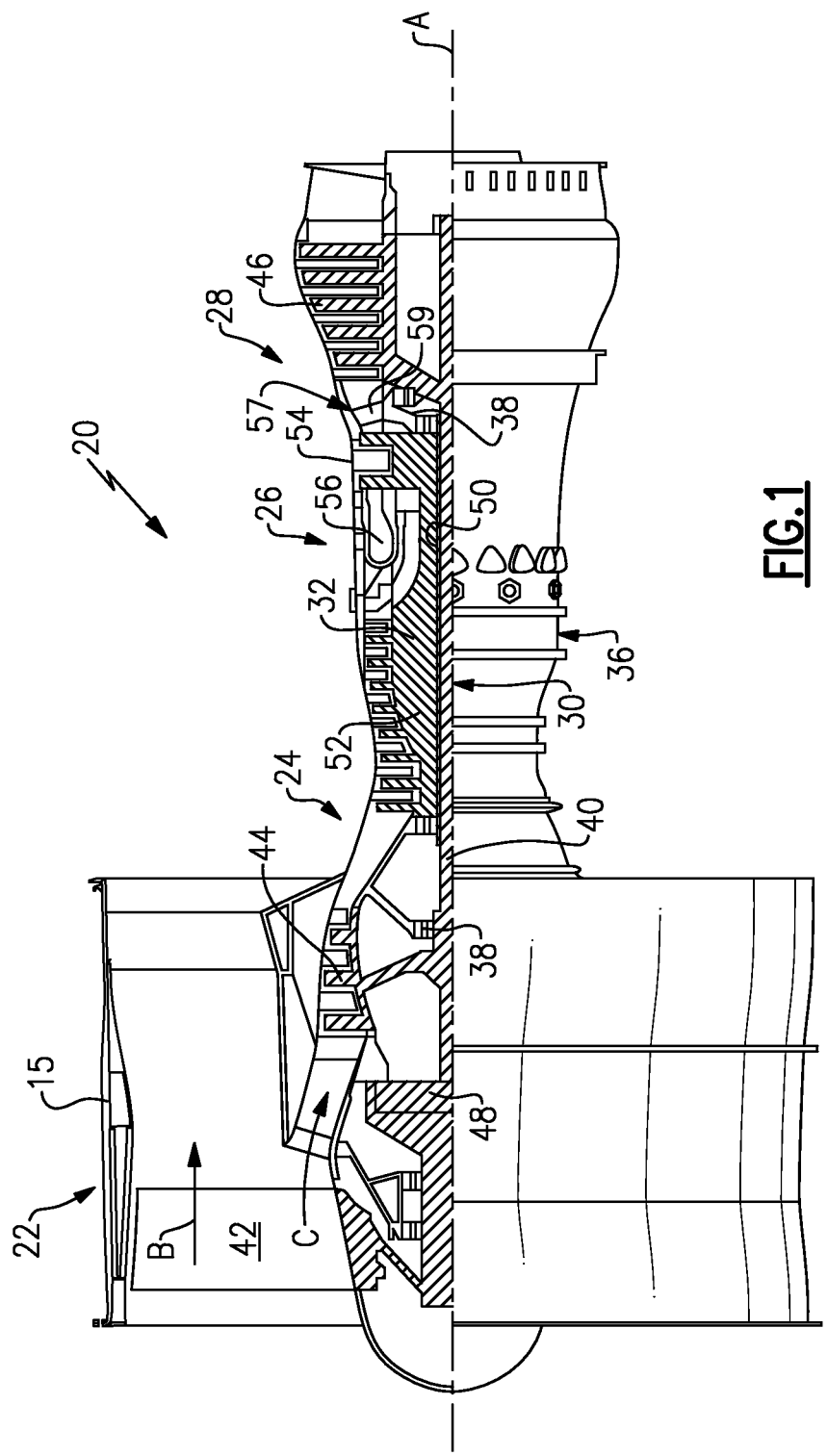
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
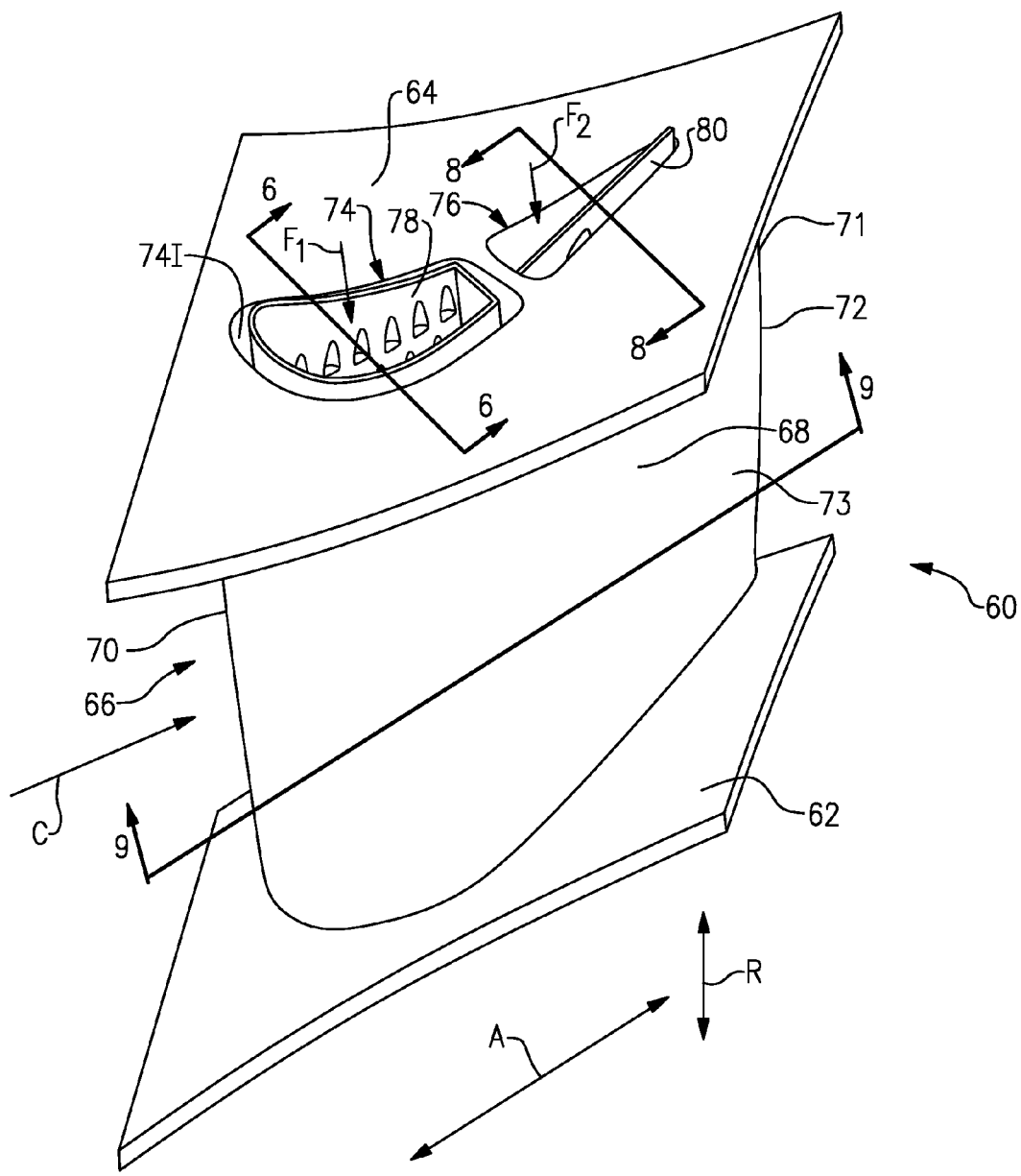
FIG. 2 is a perspective view of an example engine component.

FIG. 2 illustrates an example engine component 60 ("component 60"). As illustrated, the component 60 is a stator vane. This disclosure could extend to rotor blades, inlet guide vanes, and other airfoil structures. This disclosure could further extend to blade outer air seals (BOAS), combustor liners, or other engine components. The component 60 is designed for the turbine section 28 of the engine 20, but could alternatively be designed for the compressor section 24. This disclosure may be particularly beneficial when used in the turbine section 28, as the components in the turbine section 28 are exposed to relatively high temperatures during operation of the engine 20.

The example component 60 includes an inner platform 62, an outer platform 64, and an airfoil section 66 extending between the inner and outer platforms 62, 64 in a radial direction R, which is normal to the engine central longitudinal axis A. The airfoil section 66 includes an airfoil wall 68, which is directly exposed to the fluid within the core airflow path C. The airfoil wall 68 includes a leading edge 70, a trailing edge 72, and first and second side walls 71, 73, which can be associated with pressure and suction sides, for example.

Figure 9:
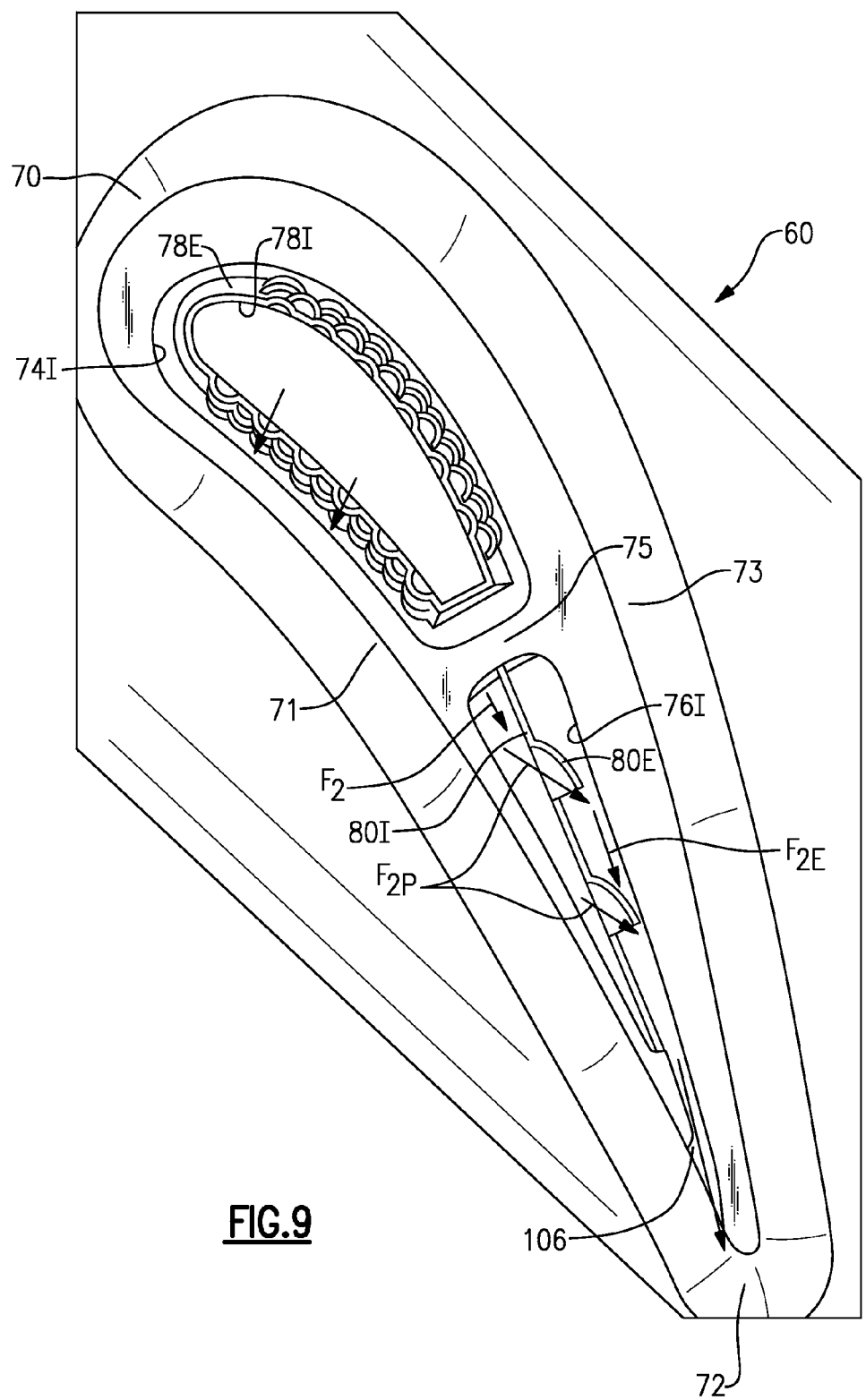
FIG. 9 is a cross-sectional view taken along line 9-9 in FIG. 2.

In this example, the component 60 includes first and second internal cavities 74, 76. The first internal cavity 74 is adjacent the leading edge 70, and the second internal cavity 76 is adjacent the trailing edge 72. The internal cavities 74, 76 are bound by internal cavity walls 74I, 76I (FIG. 9), and a partition 75 (FIG. 9) between the first and second internal cavities 74, 76. This disclosure is not limited to components having two cavities, and extends to components including any number of cavities.

The component 60 includes baffles 78, 80 for distributing, or augmenting, flows of fluid $F_1$, $F_2$ within the respective cavities 74, 76. FIG. 3 illustrates an isolated view of the baffles 78, 80 without the remainder of the component 60. In this example the baffles 78, 80 are separate structures from the remainder of the component 60. The engine component 60 may in one example be formed of a high temperature alloy, such as Molybdenum-based alloy, or a ceramic material. The ceramic material can be a ceramic matrix composite (CMC) or a monolithic ceramic material, but is not limited to these examples. The baffles 78, 80 may be formed of steel, in one example. Other materials come within the scope of this disclosure.

The baffle 78 includes a baffle wall 82, which is shaped to follow the contour of the internal cavity wall 74I. In this example, the baffle wall 82 includes a leading edge 84, a trailing edge 86, and pressure and suction sides 88, 90. The baffle wall 82 provides a perimeter, and is spaced inwardly from the internal cavity wall 74I. The baffle 78 is arranged to augment the flow of fluid $F_1$ as it flows from the interior 78I to the exterior 78E of the baffle 78 (FIG. 6), as will be explained below.

A plurality of mixing lobes 92 project outward from the pressure and suction sides 88, 90 of the baffle 78. The leading and trailing edges 84, 86 of the baffle 78 may alternatively, or additionally, include lobes. FIG. 4 illustrates an example lobe 92 in cross-section. The lobe 92 includes a projection 94, which extends from an exterior surface 90E of the suction side 90 of the baffle 78, and at least partially covers an orifice 96 formed through the suction side 90.

In the illustrated example, the projection 94 extends outward from the exterior surface 90E. From top to bottom in FIG. 4, the projection extends between a first end, or apex, 98 and a second end, or terminus 100. Between the apex 98 and the terminus 100, the projection 94 spans a majority of the radial length S of the orifice 96, and at least partially covers the orifice 96 when viewed from the perspective of the internal cavity wall 74I.

The terminus 100 of the projection 94 is spaced-apart from the exterior surface 90E and provides an injection orifice 102 between an interior surface 94I of the projection 94 and the exterior of the suction side 90. In this example, the interior surface 94I is provided at a relatively shallow angle M relative to the exterior surface 90E. In one example, the angle M is provided between a tangent line 94T of the projection 94, and a line 90P parallel to the exterior surface 90E. The angle M, in one example, is less than or equal to 30°. The angle M allows for a minimal amount of pressure loss as fluid $F_1$ flows from the interior to the exterior of the baffle 78.

Figure 5:
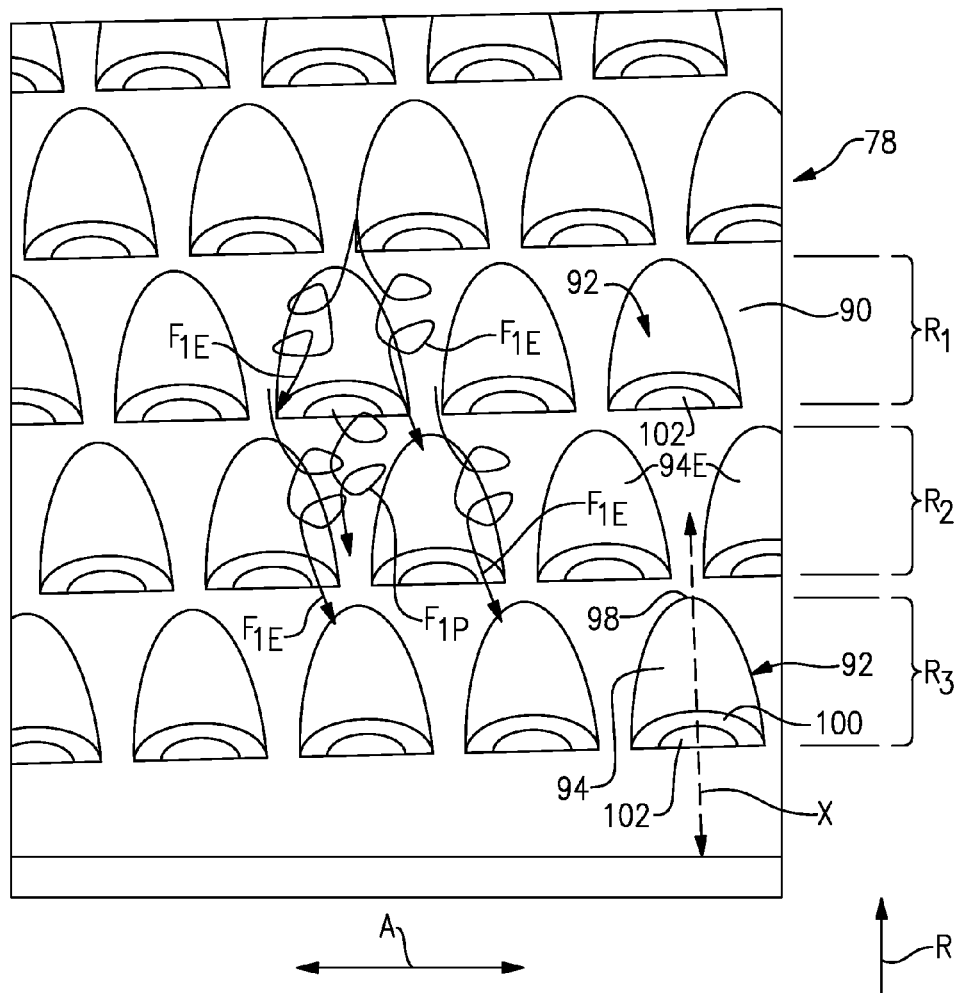
FIG. 5 is a close-up view of the enclosed area in FIG. 3 labeled "FIG. 5."

The detail and arrangement of the lobes 92 is further illustrated relative to FIG. 5, which is a view of the boxed-in area in FIG. 3. As illustrated in FIG. 5, the lobes 92 extend from the apex 98 to the terminus 100 along an axis X. As illustrated, the axis X is a central axis. However, the lobes 92 may be asymmetrical, and the axis X need not be a central axis. In this example, the lobes 92 are radially oriented, meaning the axis X is substantially parallel to the radial direction R. However, the axis X can be oriented in any direction, determined by the direction that flow $F_{1E}$ (FIG. 7) takes to exit component 60.

Further, as seen in FIG. 5, the projection 94 is curved circumferentially relative to the axis X. In general, the projection 94 is closer to the suction side 90 at points circumferentially further from the axis X. The projection 94 is furthest from the suction side 90 at a point on the axis X and at the terminus 100. Essentially, the lobe 92 resembles a partial, ellipsoid (i.e., a partial, three-dimensional ellipse).

Additionally, the lobes 92 may be arranged on the baffle 78 in rows. In one example, adjacent rows $R_1$, $R_2$, $R_3$ of the lobes 92 may be staggered, such that the injection orifice 102 of the lobes 92 in row $R_1$ are axially aligned, relative to the engine central longitudinal axis A, with the apexes 98 of the lobes in row $R_3$, and are positioned axially between the lobes of the intermediate row $R_2$. This staggered relationship allows a flow of fluid exiting the injection orifices 102 of row $R_1$ to essentially roll off of the exterior surfaces 94E of the projections 94 in row $R_2$, which swirls the flow and enhances mixing downstream.

Figure 6:
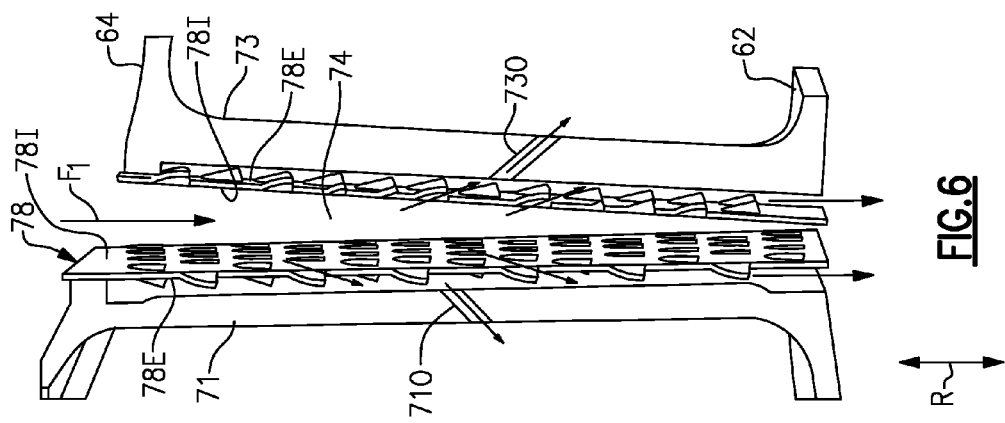
FIG. 6 is a cross-sectional view taken along line 6-6 in FIG. 2.

FIG. 6 is a cross-sectional view taken along line 6-6 from FIG. 2. FIG. 6 illustrates the manner in which the fluid $F_1$ interacts with the lobes 92 as it is directed from the interior 78I to the exterior 78E of the baffle 78. In this example, the fluid $F_1$ initially flows into the interior of the baffle 78 from a radially outer location. Ultimately, the fluid $F_1$ flows through to a radially inner location, or will flow through orifices 710, 730 formed in the pressure and suction side walls 71, 73, respectively, into the core airflow path C.

Figure 7:
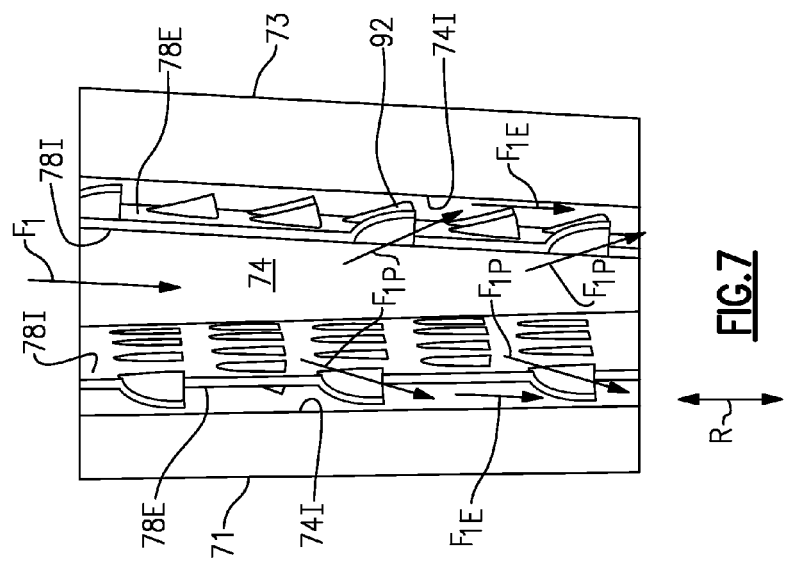
FIG. 7 is a close-up view of the enclosed area in FIG. 6 labeled "FIG. 6."

Referring to FIG. 7, as the fluid $F_1$ travels radially through the interior cavity 74, a portion $F_1$ of the fluid $F_1$ flows through the orifices 96 in the baffle 78 (perhaps best seen in FIG. 4). The portion $F_1$ then radially flows between the internal cavity wall 74I and the exterior of the baffle 78 to cool the airfoil section 66.

As the portion $F_{1P}$ passes through the injection orifice 102, in one example, the portion $F_{1P}$ is swirled due to the curved nature of the interior surface 94I of the projection 94 (as shown in FIG. 5). Due to the curved nature of the exterior surface 94E of the projections 94, the flow is further swirled as it travels along the exterior wall of the baffle 78, as illustrated at $F_{1E}$. Downstream from the injection orifice 102, the swirling flows $F_{1P}$, $F_{1E}$ come together. The swirling nature of the flows $F_{1P}$, $F_{1E}$ leads to high rates of heat transfer within the component 60, and increases cooling of the component 60.

Turning back to FIG. 3, the baffle 80 in this example is provided by a substantially planar baffle wall 103. The baffle wall 103 includes a plurality of lobes 104, which have substantially the same structure as the lobes 92, with the exception of the lobes 104 being axially oriented. That is, the lobes 104 are arranged around an axis Z, which is substantially normal to the axis X, and is substantially parallel to the engine central longitudinal axis A. However, the axis Z can be oriented in any direction, determined by the direction that flow $F_{2E}$ (FIG. 9) takes to exit component 60.

Figure 8:
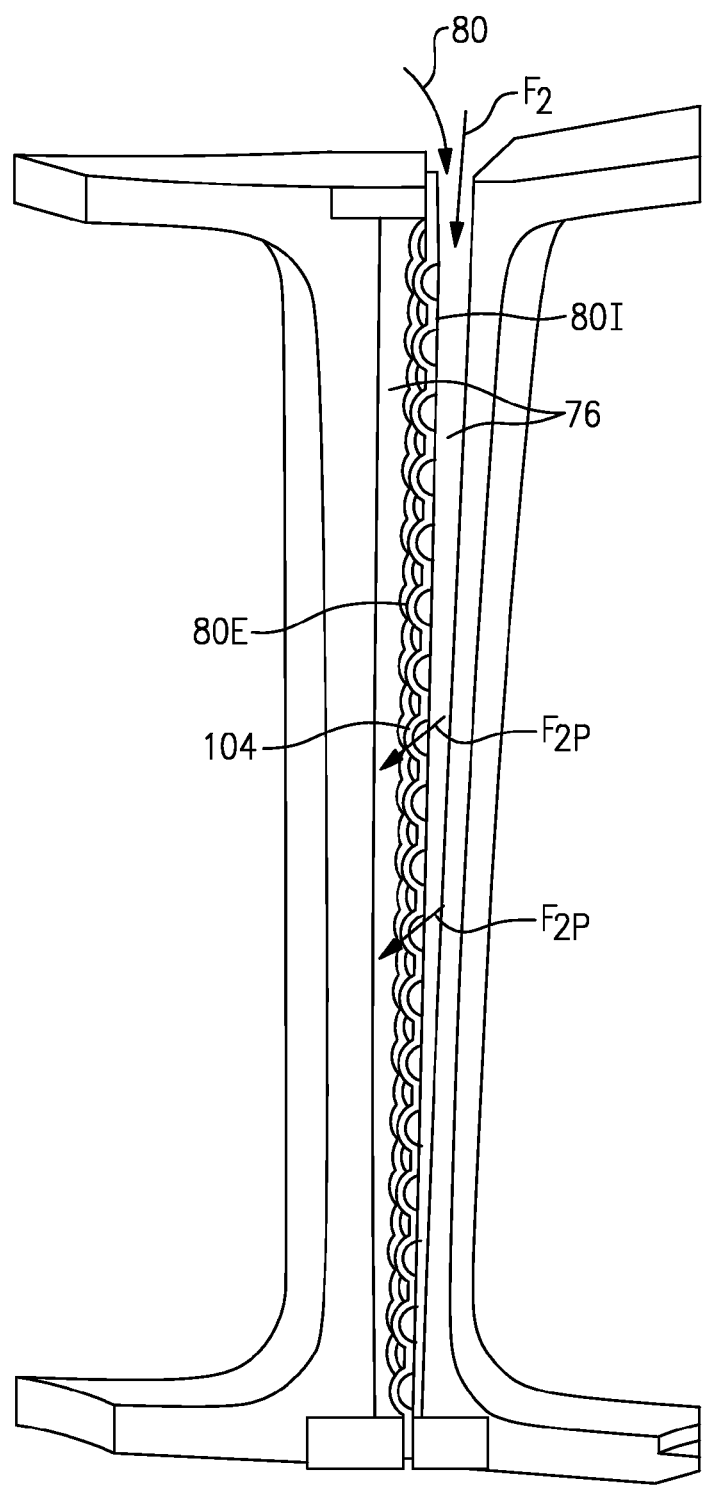
FIG. 8 is a cross-sectional view taken along line 8-8 in FIG. 2.

FIG. 8 is a cross-sectional view taken along line 8-8 from FIG. 2, and illustrates the detail of the baffle 80 within the second internal cavity 76. In this example, a flow of fluid $F_2$ is configured to radially enter the second cavity 76 from a radially outer location. Further, in this example, the fluid $F_2$ is configured to axially exit orifices 106 (FIG. 9) formed adjacent the trailing edge 72 of the component 60.

In this example, the baffle wall 103 separates the internal cavity into two sides. The flow $F_2$ enters the cavity 76 on a first, interior side 80I of the baffle 80. A portion of the flow $F_{2P}$ is directed through the baffle 80, and then flows through the internal cavity 76 along an exterior side 80E of the baffle 80. The baffle 80 augments the flow of fluid $F_2$, such that the portion of the flow $F_{2P}$ is essentially swirled in the same way as the flow $F_{1P}$, and mixes with a flow $F_{2E}$ (FIG. 9) in substantially the same way as described above relative to the flows $F_{1P}$ and $F_{1E}$.

It should be understood that the internal cavities 74, 76, may be formed by plunging or carbon fiber layup techniques, such that the internal cavity walls 74I, 76I are substantially smooth. The baffles 78, 80 may be provided with the lobes 92, 104 by stamping or additive manufacturing techniques. Other manufacturing techniques come within the scope of this disclosure.

In the examples where rotor blades or BOAS include lobes similar to those illustrated herein, the lobes may be formed using additive manufacturing or casting techniques. Further, while the lobes 92, 104 are illustrated as being positioned within an airfoil section 66, lobes can be incorporated into fluid passageways within other structures, such as platforms, etc.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations.

It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A component for a gas turbine engine, comprising:
a first internal cavity and a second internal cavity, the first internal cavity provided adjacent a leading edge of the engine component, and the second internal cavity provided adjacent a trailing edge of the engine component;
a baffle provided in the first internal cavity of the engine component, the baffle including a wall having a plurality of orifices therethrough, the baffle further including a plurality of lobes extending from the wall and at least partially covering a corresponding one of the plurality of orifices;
wherein the plurality of lobes on the baffle are each provided about a respective central axis the central axes of each of the plurality of lobes on the baffle being oriented in a radial direction.

2. The component as recited in claim 1, wherein each lobe of the plurality of lobes includes a projection, the projection connected to the wall at a first end and spaced-apart from the wall at a second end.

3. The component as recited in claim 2, wherein the second end of the projection provides an injection orifice.

4. The component as recited in claim 3, wherein the projection is inclined at an angle of less than or equal to 30°, relative to the wall, adjacent the injection orifice.

5. The component as recited in claim 3, including a source of fluid, the fluid configured to flow adjacent the baffle, and wherein a portion of the fluid flows through the plurality of orifices of the wall and is directed through the injection orifice by the projection.

6. The component as recited in claim 1, wherein the baffle is a first baffle, and wherein the second internal cavity includes a second baffle.

7. The component as recited in claim 6, wherein the first baffle has a perimeter, the first baffle including a leading edge, a trailing edge, a pressure side and a suction side, wherein the plurality of orifices and the plurality of lobes are included on both the pressure side and the suction side.

8. The component as recited in claim 7 wherein the second baffle includes a substantially planar wall, the wall including a plurality of orifices and a plurality of lobes projecting therefrom to at least partially cover a corresponding orifice.

9. The component as recited in claim 8, wherein the plurality of lobes on the second baffle are provided about a central axis, the central axis being axially oriented.

10. The component as recited in claim 1, wherein the component is a stator vane.

11. A gas turbine engine, comprising:
a compressor section, a combustor section, and a turbine section;
a component provided in one of the compressor section, combustor section, and the turbine section, the component having an internal cavity, wherein a baffle is provided in the internal cavity, the baffle including a wall and a plurality of orifices provided through the wall, the baffle further including a plurality of lobes extending from the wall and at least partially covering a corresponding one of the plurality of orifices;
wherein the plurality of lobes on the baffle are each provided about a respective central axis, the central axes of each of the plurality of lobes on the baffle being oriented in a radial direction.

12. The engine as recited in claim 11, wherein the lobe includes a projection, the projection connected to the wall at a first end and spaced-apart from the wall at a second end.

13. The engine as recited in claim 12, wherein the second end of the projection provides an injection orifice.

* * * * *